2,767,199
RING A HALOGENATED ALLOPREGNANES

Carl Djerassi, Birmingham, Mich., and George Rosenkranz, Mexico City, Mexico, assignors, by mesne assignments, to Syntex S. A., Mexico City, Mexico, a corporation of Mexico No Drawing. Application March 6, 1953,
Serial No. 340,897
Claims priority, application Mexico March 7, 1952
3 Claims. (Cl. 260—397.45)

The present invention relates to novel cyclopentanophenanthrene derivatives and to a method for the preparation thereof.

More particularly, the present invention relates to Ring A unsaturated compounds of the pregnene and allopregnen series having 17α and 21-hydroxy groups and 3,11 and 20-keto groups, as well as to esters thereof.

In accordance with the present invention, it has been discovered that allopregnan-11α,17α-diol-3,20-dione and its esters and 16α,17α-oxido-allopregnan-11α-ol-3,20-dione may be converted into the novel $\Delta^1$-allopregnen-11α,17α-diol-3,20-dione and esters thereof, the corresponding $\Delta^{1,4}$-isomers and the corresponding $\Delta^4$-pregnen compounds. In accordance with the present invention, there has been further discovered that the aforementioned starting materials may be converted into certain novel bromo compounds as well as other certain novel intermediates for the production of the final compounds referred to.

The final products of the present novel process just referred to have therapeutic hormone activity, especially of the type characterizing the adrenal cortical steroids. Further, since the 11α-hydroxy group of the final compounds may be readily oxidized with chromic acid for example and the compounds may also be provided with the 21-acetoxy group by conventional methods such as treatment with lead tetracetate, they are also intermediates for the production of corresponding Ring A unsaturated pregnane compounds. These Ring A unsaturated compounds would have the 3,11 and 20-ketone groups and the 17α and 21-hydroxy groups and could further be converted by hydrogenation to the corresponding Ring A saturated allopregnan-17α,21-diol-3,11,20-trione. This last compound can be reduced as by lithium aluminum hydride to the corresponding pentol and cortical hormone, i. e., Reichstein's Substance A.

The following equation serves to illustrate a portion of the present invention:

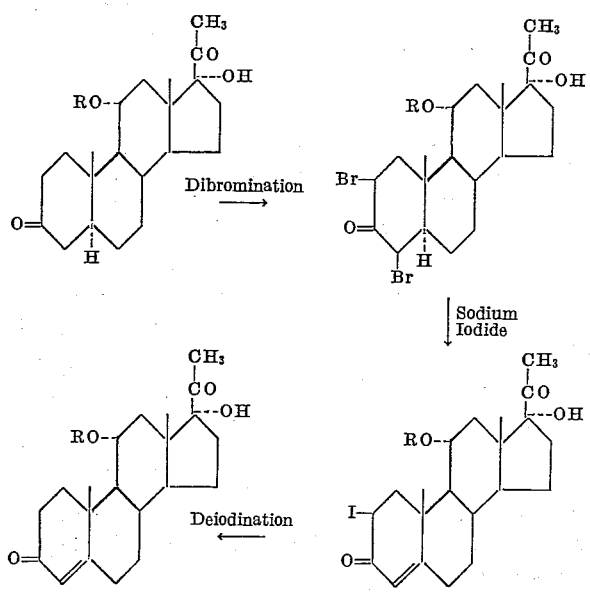

In the above equation, R preferably represents an acyl group, i. e., the residue of an organic acid conventionally used for the esterification of steroid alcohols. More particularly, R represents the residue of a lower fatty acid such as acetic or propionic or the residue of an aromatic acid such as benzoic. R may also represent hydrogen.

In practicing the process above outlined, an 11-monoester of allopregnan-11α,17α-diol-3,20-dione prepared in accordance with our United States application, Serial No. 337,431, filed February 17, 1953, dissolved in a suitable solvent, such as glacial acetic acid, is treated with 2 molar equivalents of bromine in acetic acid in the presence of a catalytic amount of hydrogen bromide. Preferably, during the addition of the bromine in acetic acid which took approximately 15 minutes, the temperature of the mixture is kept at room temperature. After standing for a suitable length of time, in order to complete the rearrangement of the 2,2'-dibromo compound first formed, into the more stable 2,4-dibromo derivative, the solution is diluted with water and the precipitate suitably purified.

The 2,4-dibromo derivative thus produced is then treated with sodium iodide in the presence of a lower aliphatic ketone solvent or with an equivalent alkali metal iodide to prepare the corresponding 2-iodo-$\Delta^4$-compound. The 2-iodo-$\Delta^4$-compound is then subjected to treatment with a deiodinating agent, as for example, chromous chloride, sodium bisulfite, or a tertiary amine such as collidine or dimethylaniline or with a dehalogenating agent such as Raney nickel. The resultant 11-monoester of $\Delta^4$-pregnen-11α,17α-diol-3,20-dione can then be readily converted into the free compound by conventional saponification.

The same compounds just referred to can be prepared by another method which is illustrated by the following equation:

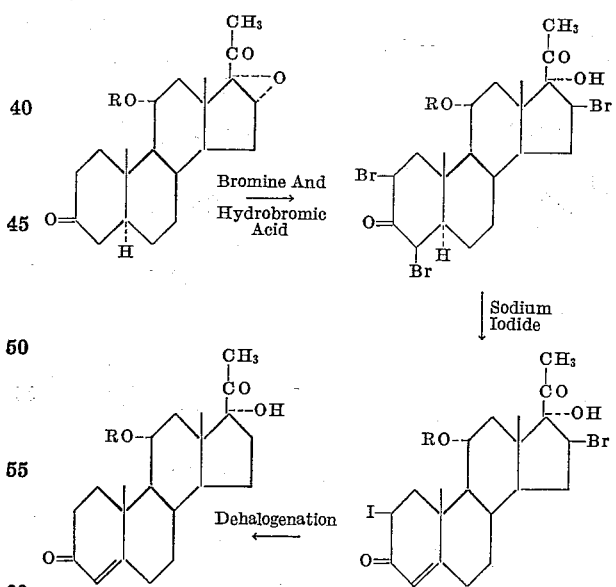

In the above equation, R represents the same groups as hereinbefore set forth.

It will be noted that the process in general is quite similar to the first process outlined. The starting material, however, is the corresponding 16α,17α-oxido compound, instead of the 17α-hydroxy compound. This compound is also disclosed in the aforementioned United States application. The oxido compound is treated with bromine and with an excess of hydrobromic acid, preferably, in the presence of glacial acetic acid. The resultant compound is the 2,4,16-tribromo-17α-hydroxy derivative. Upon treating this last derivative with sodium iodide, the corresponding 2-iodo-$\Delta^4$-compound is produced. This compound may then be dehalogenated in a single step by using a dehalogenating agent such as Raney nickel. In the alternative, it may be first treated with a deiodinating agent, such as the deiodinating agents previously mentioned and, thereafter, treated with a dehalogenating (debrominating) agent such as Raney nickel. The final compound produced is the same as heretofore, namely, an 11-monoester of $\Delta^4$-pregnen-11$\alpha$,17$\alpha$-diol-3,20-dione.

The brominated derivatives of allopregnan-11$\alpha$,17$\alpha$-diol-3,20-dione and/or its esters, may be utilized for the production of novel Ring A unsaturated steroids such as the corresponding $\Delta^1$- and $\Delta^{1,4}$-derivatives, in accordance with the following equations:

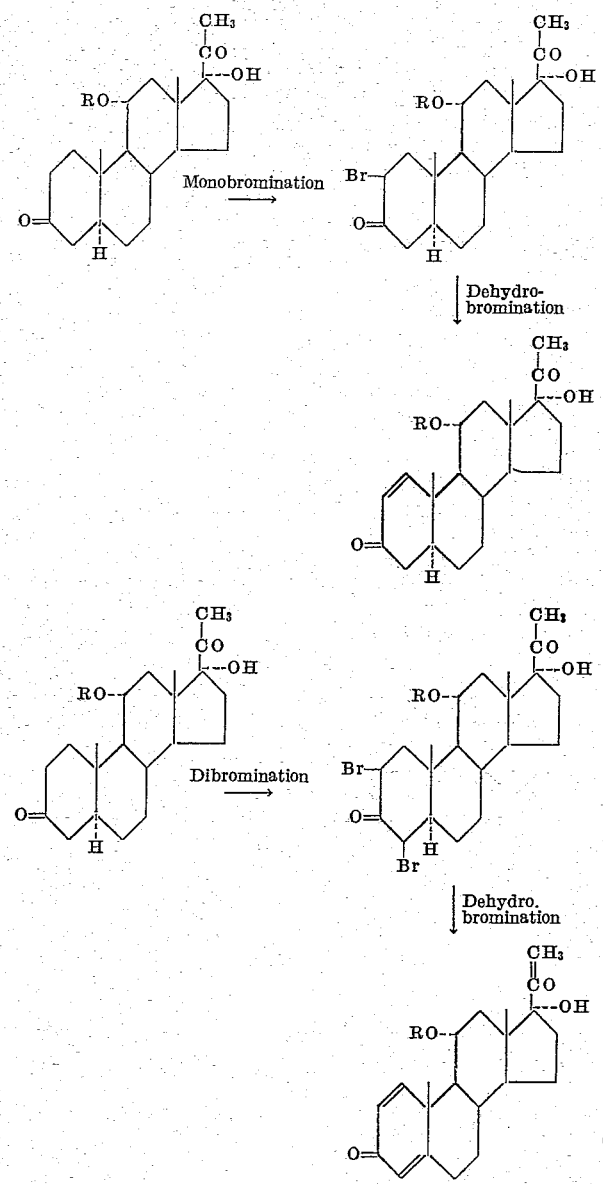

In the above equations, R represents the same groups as heretofore set forth.

In proceding in accordance with the above equations, the starting material which may be a suitable ester, such as the 11-monoacetate of allopregnan-11$\alpha$,17$\alpha$-diol-3,20-dione, is treated either with one molar equivalent of bromine or two molar equivalents, depending upon whether the 2-bromo derivative is desired or the 2,4-dibromo derivative. Thereafter, these bromo derivatives are subjected to dehydrobromination by treatment with the dehydrobrominating agent, i. e., a tertiary amine, such as lutidine or collidine, or by formation of the corresponding dinitrophenylhydrazone or semicarbazone, which is, thereafter, subjected to cleavage with a suitable agent, such as pyruvic acid.

The following specific examples serve to illustrate, but are not intended to limit the present invention:

Example I

A solution of 1 g. of allopregnan-11$\alpha$,17$\alpha$-diol-3,20-dione acetate in 60 cc. of glacial acetic acid was mixed with three drops of a 4-normal solution of hydrogen bromide in acetic acid and the mixture was treated dropwise and under mechanical stirring with a solution of 1.05 molar equivalents of bromine in acetic acid. After the solution had decolorized completely, water was added and the precipitate was filtered, washed with water and air dried. The product was 2-bromo-allopregnan-11$\alpha$,17$\alpha$-diol-3,20-dione acetate.

Example II

A solution of 1 g. of the 2-bromo derivative obtained according to Example I in 7 cc. of gamma-collidine was refluxed for 45 minutes. The mixture was cooled and the precipitate of collidine hydrobromide formed was filtered (its weight corresponded to 0.97 molar equivalent) and washed with ether. The filtrate was diluted with more ether and then washed with dilute hydrochloric acid, sodium carbonate and water, dried over sodium sulphate and evaporated to dryness. In order to purify the compound, it was dissolved in a mixture of benzene-hexane and passed through a column with 3 g. of alumina previously washed with ethyl acetate. Recrystallization from ethyl acetate yielded $\Delta^1$-allopregnen-11$\alpha$,17$\alpha$-diol-3,20-dione acetate.

In the above experiment, gamma-collidine can be substituted by 2,6-lutidine, giving the same results.

By refluxing the acetate with 1% alcoholic potassium hydroxide for 1 hour under an atmosphere of nitrogen and working up under the usual conditions, $\Delta^1$-allopregnen-11$\alpha$,17$\alpha$-diol-3,20-dione was obtained.

Example III

A solution of 1 g. of the 2-bromo derivative obtained according to Example I, 0.75 g. of semicarbazide and 0.8 g. of sodium acetate trihydrate (previously dissolved in 0.5 cc. of water) in 150 cc. of acetic acid was maintained at a temperature of 60° under an atmosphere of nitrogen during 2 hours. After this time, 10 cc. of pyruvic acid, 3 g. of sodium acetate and 20 cc. of water were added and the temperature of the mixture was raised to 75°. After 2 hours, 4 additional cc. of pyruvic acid were added and the mixture was kept standing overnight. Next day it was diluted with much water and the precipitate was extracted with chloroform, washed with sodium bicarbonate and water, dried over sodium sulphate and evaporated to dryness, thus giving $\Delta^1$-allopregnen-11$\alpha$,17$\alpha$-diol-3,20-dione acetate identical to the one obtained according to Example II.

Example IV

A solution of 2 g. of the 2-bromo derivative obtained according to Example I and 1.1 molar equivalents of 2,4-dinitrophenylhydrazine in 50 cc. of glacial acetic acid was kept at a temperature of 100° C., during 5 minutes. The solution was cooled and the orange dinitrophenylhydrazone formed was filtered and washed with alcohol. A solution of 1 g. of this compound in 50 cc. of chloroform was mixed with 75 cc. of 85% pyruvic acid and 6 cc. of a 4-normal solution of hydrogen bromide in acetic acid and the mixture was heated at 60° during 3 hours under an atmosphere of nitrogen. The solution was diluted with chloroform and water and the chloroform layer was washed with water, sodium carbonate solution and water, dried over sodium sulphate and evaporated to dryness. After one crystallization of the residue from ethyl acetate it gave $\Delta^1$-allopregnen-11$\alpha$,17$\alpha$-diol-3,20-dione acetate identical to the one obtained according to Example II.

Example V

A solution of 2 g. of allopregnan-11α,17α-diol-3,20-dione acetate in 100 cc. of glacial acetic acid containing 5 drops of a 4-normal solution of hydrogen bromide in acetic acid was treated dropwise and under mechanical stirring with a solution of 2 molar equivalents of bromine in 5 cc. of acetic acid. The addition took approximately 15 minutes and during this time the temperature of the mixture was kept at 20°. At the end of this time, 1 more cc. of the hydrogen bromide solution was added and the mixture was kept overnight in order to complete the rearrangement of the 2,2'-dibromo configuration into the more stable 2,4-dibromo configuration. The solution was then diluted with water and the precipitate of 2,4-dibromo-allopregnan-11α,17α-diol-3,20-dione acetate was filtered, washed with water and air dried.

Example VI

A solution of 1 g. of the 2,4-dibromo compound obtained according to Example V in 8 cc. of collidine was refluxed for 40 minutes and then treated according to the method described in Example II. The product was crystallized from ethyl acetate to give $\Delta^{1,4}$-pregnadien-11α,17α-diol-3,20-dione.

Saponification by the method described in Example II yielded the free $\Delta^{1,4}$-pregnadien-11α,17α-diol-3,20-dione.

Example VII

A solution of 3 g. of the 2,4-dibromo derivative obtained according to Example V in 100 cc. of acetone (or methyl-ethyl-ketone) was refluxed during 20 hours with 3.6 g. of sodium iodide. The mixture was cooled, diluted with ether and washed with water, sodium thiosulphate solution, sodium bicarbonate and water. The ether solution was dried over sodium sulphate and evaporated to dryness under reduced pressure leaving as a residue the crude 2-iodo-Δ-pregnen-11α,17α-diol-3,20-dione acetate.

Example VIII

A solution of 1.5 g. of the crude 2-iodo-$\Delta^4$-pregnen-11α,17α-diol-3,20-dione acetate in 200 cc. of acetone was treated under an atmosphere of carbon dioxide with a solution of chromous chloride prepared from 12 g. of chromic chloride by the method described by Rosenkranz, Mancera, Gatica and Djerassi, J. Am. Chem. Soc., 72, 4077 (1950). The solution was kept at room temperature for 15 minutes and then it was diluted with water, extracted with ether, washed with sodium bicarbonate and water, dried over sodium sulphate and concentrated to a small volume until the product started to crystallize. After cooling, the product was filtered and recrystallized from acetone-hexane to give $\Delta^4$-pregnen-11α,17α-diol-3,20-dione acetate with a melting point of 206°–208° C., $[\alpha]_D + 75°$ (Chloroform).

Saponification by the method described in Example II yielded $\Delta^4$-pregnen-11α,17α-diol-3,20-dione with a melting point of 215°–218° C., $[\alpha]_D + 87.88°$ (Chloroform).

Example IX 1 g. of the iodo compound obtained according to Example VII in 10 cc. of collidine was refluxed for 30 minutes and the cooled solution was diluted with ether and washed with dilute hydrochloric acid and water, dried over sodium sulphate and evaporated to dryness leaving as residue a product identical to the one obtained according to Example VIII. In this reaction, collidine can be substituted by 2,6-lutidine or dimethylaniline.

The Raney nickel treatment such as described in Example X can also be applied with the same results.

Example X

A solution of 1 g. of 16α,17α-oxido-allopregnan-11α-ol-3,20-dione acetate in 60 cc. of glacial acetic acid was treated with 1 cc. of a 4-normal solution of hydrogen bromide in acetic acid, and after 10 minutes a solution of 2 molar equivalents of bromine in 35 cc. of acetic acid was added dropwise in a period of 20 minutes. One additional cc. of the hydrogen bromide solution was added and the mixture was kept standing during 8 hours at room temperature and then it was diluted with water. The precipitate was collected, washed with water and dried in the air. The 2,4,16-tribromo-allopregnan-11α,17α-diol-3,20-dione acetate thus obtained was treated with sodium iodide in acetone (or methylethyl-ketone) by the method described in Example VII. This reaction yielded 2-iodo-16-bromo-$\Delta^4$-pregnen-11α, 17α - diol - 3,20 - dione acetate. This compound was refluxed during 5 hours in alcohol solution with 10 times its weight of Raney nickel. After removing the catalyst the solution was evaporated to dryness and in order to purify the product it was dissolved in a mixture of benzene-hexane and passed through a short column with alumina previously washed with ethyl acetate. Recrystallization from acetone-hexane afforded $\Delta^4$-pregnen-11α,17α-diol-3,20-dione acetate identical to the one obtained according to Example VIII.

We claim:

1. A new compound selected from the class consisting of 2-bromo-allopregnan-11α,17α-diol-3,20-dione, lower fatty acid esters thereof, benzoic acid esters thereof and 2,4-dibromo-allopregnan-11α,17α-diol-3,20-dione, lower fatty acid esters thereof and benzoic acid esters thereof.

2. 2-bromo-allopregnan-11α,17α-diol-3,20 - dione  11-monoacetate.

3. 2,4-dibromo-allopregnan-11α,17α-diol-3,20-dione 11-monoacetate.

References Cited in the file of this patent
UNITED STATES PATENTS 2,602,769     Murray et al. _____ July 8, 1952